(12) United States Patent
Aso et al.

(10) Patent No.: US 10,897,174 B2
(45) Date of Patent: Jan. 19, 2021

(54) STATOR, MOTOR, AND AIR CONDITIONER

(71) Applicant: Mitsubishi Electric Corporation, Tokyo (JP)

(72) Inventors: Hiroki Aso, Tokyo (JP); Tomoaki Oikawa, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/084,671

(22) PCT Filed: Jun. 28, 2016

(86) PCT No.: PCT/JP2016/069126
§ 371 (c)(1),
(2) Date: Sep. 13, 2018

(87) PCT Pub. No.: WO2018/003013
PCT Pub. Date: Jan. 4, 2018

(65) Prior Publication Data
US 2019/0334403 A1    Oct. 31, 2019

(51) Int. Cl.
*H02K 3/52* (2006.01)
*H02K 11/215* (2016.01)
(Continued)

(52) U.S. Cl.
CPC .............. *H02K 3/522* (2013.01); *H02K 3/38* (2013.01); *H02K 5/10* (2013.01); *H02K 11/215* (2016.01);
(Continued)

(58) Field of Classification Search
CPC ............ H02K 3/522; H02K 3/38; H02K 5/10; H02K 11/215; H02K 2203/03; H02K 2203/06; H02K 2211/03; F24F 1/0018
(Continued)

(56) References Cited

U.S. PATENT DOCUMENTS 6,445,535 B1    9/2002   Rehm
6,680,553 B1 *  1/2004   Takano .................... H02K 3/50
                                                    310/156.05
(Continued)

FOREIGN PATENT DOCUMENTS

EP    1003268 A1    5/2000
JP    S64-16181 U   1/1989
(Continued)

OTHER PUBLICATIONS

International Search Report of the International Searching Authority dated Aug. 30, 2016 for the corresponding international application No. PCT/JP2016/069126 (and English translation).
(Continued)

*Primary Examiner* — Forrest M Phillips
(74) *Attorney, Agent, or Firm* — Posz Law Group, PLC

(57) ABSTRACT

A stator to which a power supply lead wire for supplying electric power is connected, includes a stator core, a winding wound around the stator core, a winding terminal connected to the winding, a circuit board connecting the power supply lead wire and the winding terminal to each other and having a surface facing the stator core, a power supply terminal provided on the surface and connected to the power supply lead wire, and a wiring pattern provided on the surface and connecting the winding terminal and the power supply terminal to each other.

9 Claims, 9 Drawing Sheets

(51) Int. Cl.
*H02K 3/38* (2006.01)
*H02K 5/10* (2006.01)
*F24F 1/0018* (2019.01)

(52) U.S. Cl.
CPC ........ *F24F 1/0018* (2013.01); *H02K 2203/03* (2013.01); *H02K 2203/06* (2013.01); *H02K 2211/03* (2013.01)

(58) Field of Classification Search
USPC .......................................................... 310/71
See application file for complete search history.

(56) References Cited

U.S. PATENT DOCUMENTS

| | | | | |
|---|---|---|---|---|
| 9,702,366 | B2* | 7/2017 | Aso | F04D 13/0606 |
| 9,705,375 | B2* | 7/2017 | Yamamoto | H02K 29/08 |
| 9,712,014 | B2* | 7/2017 | Kuroiwa | H02K 3/522 |
| 9,954,412 | B2* | 4/2018 | Yamamoto | H02K 15/12 |
| 2014/0292125 | A1* | 10/2014 | Kanda | H02K 11/33 310/71 |
| 2016/0197530 | A1* | 7/2016 | Fujii | F04D 25/088 417/423.7 |
| 2016/0254722 | A1* | 9/2016 | Yamamoto | H02K 5/225 310/71 |

FOREIGN PATENT DOCUMENTS

| | | |
|---|---|---|
| JP | H05-236692 A | 9/1993 |
| JP | 2000-156961 A | 6/2000 |
| JP | 2001-057013 A | 2/2001 |
| JP | 2012-139027 A | 7/2012 |
| JP | 2015-065790 A | 4/2015 |

OTHER PUBLICATIONS

Office Action dated Feb. 6, 2020 issued in corresponding CN patent application No. 201680085931.3 (and English translation).
Office Action dated Feb. 18, 2020 issued in corresponding JP patent application No. 2018-524620 (and English translation).
Office Action dated Oct. 15, 2019 issued in corresponding KR patent application No. 10-2018-7034020 (and English translation).
Office Action dated Aug. 6, 2019 issued in corresponding JP patent application No. 2018-524620 (and English translation).
Korean Office Action dated Apr. 7, 2020 in corresponding Korean application No. 10-2018-7034020 ( and English translation).
Office Action dated Aug. 31, 2020 in corresponding Chinese application No. 201680085931.3 ( and English translation).

* cited by examiner

STATOR, MOTOR, AND AIR CONDITIONER

CROSS REFERENCE TO RELATED APPLICATION

This application is a U.S. national stage application of International Patent Application No. PCT/JP2016/069126 filed on Jun. 28, 2016, the disclosure of which is incorporated herein by reference.

TECHNICAL FIELD

The present invention relates to a stator, a motor, and an air conditioner.

BACKGROUND ART

In general, a stator of a motor includes a stator core, an insulation part covering teeth of the stator core, and a winding of each phase made of magnet wire wound around the teeth via the insulation part. In the stator of a motor, a printed circuit board having a wiring pattern for supplying electric power to a terminal of the winding of each phase is used. Patent Reference 1 describes a printed circuit board supporting device of a commutatorless motor, in which terminal pins are electrically connected to the wiring pattern of the printed circuit board by inserting support projections and the terminal pins into through holes of the printed circuit board.

PATENT REFERENCE

Patent Reference 1: Japanese Utility Model Application Publication No. 64-16181 (for example, Line 17 on Page 9 to Line 15 on Page 11)

However, in the device described in Patent Reference 1, a necessary wiring pattern is printed with copper foil and principal components forming a drive circuit, such as a driver IC, a transistor array and a power transistor, are arranged on a front surface of the printed circuit board, while Hall effect elements, capacitors and fixed resistors used for detecting the position of the rotor are arranged on a back surface of the printed circuit board. Therefore the printed circuit board is a double-sided board processed on both sides and there is a problem in that the manufacturing cost rises.

SUMMARY

The present invention has been made to resolve the above-described problem with the conventional technology, and the object of the present invention is to provide a stator, a motor and an air conditioner capable of reducing the manufacturing cost.

A stator according to an aspect of the present invention is a stator to which a power supply lead wire for supplying electric power is connected, comprising a stator core, a winding wound around the stator core, a winding terminal connected to the winding, a circuit board connecting the power supply lead wire and the winding terminal to each other and having a surface facing the stator core, a power supply terminal provided on the surface and connected to the power supply lead wire, and a wiring pattern provided on the surface and connecting the winding terminal and the power supply terminal to each other.

A motor according to another aspect of the present invention comprises the aforementioned stator, a rotor, and a support part to which the stator is fixed and which rotatably supports the rotor.

An air conditioner according to another aspect of the present invention is an air conditioner comprising a blower, wherein the blower includes the aforementioned motor.

According to the stator, the motor and the air conditioner according to the present invention, the effect of reducing the manufacturing cost can be obtained.

DETAILED DESCRIPTION

Figure 1A:
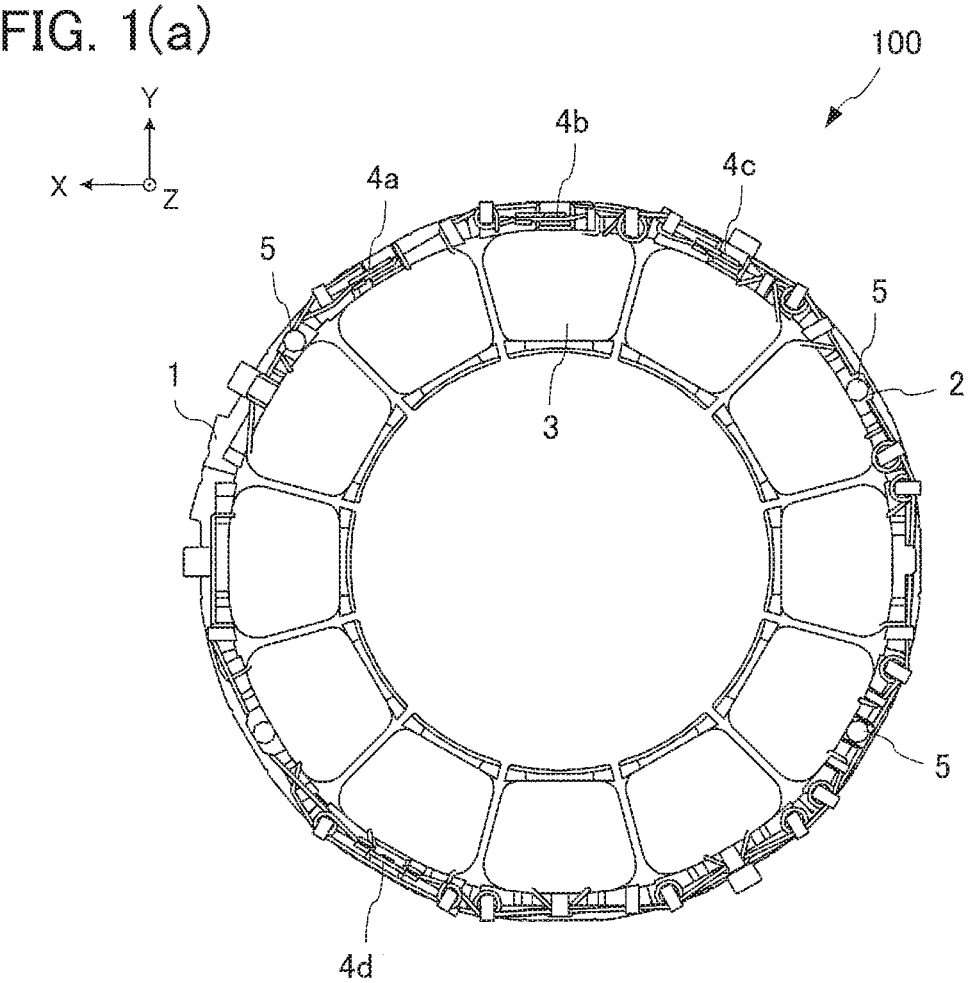
FIG. 1(a) is a top view showing a schematic configuration of a stator (in a state in which a printed circuit board is not attached thereto) according to a first embodiment of the present invention.

A stator 100, a motor 200 and an air conditioner 300 according to embodiments of the present invention will be described below with reference to the drawings. An XYZ orthogonal coordinate system is shown in the drawings to facilitate the understanding of the relationship among the drawings. A Z-axis in the drawings is shown as a coordinate axis parallel to an axis line of the stator 100. A Y-axis in the drawings is shown as a coordinate axis parallel to (or substantially parallel to) a lengthwise direction of a lead wire part 10. An X-axis in the drawings is shown as a coordinate axis orthogonal to both the Y-axis and the Z-axis. In the drawings, the same components are assigned the same reference character as each other.

(1) First Embodiment (1-1) Configuration

Figure 1B:
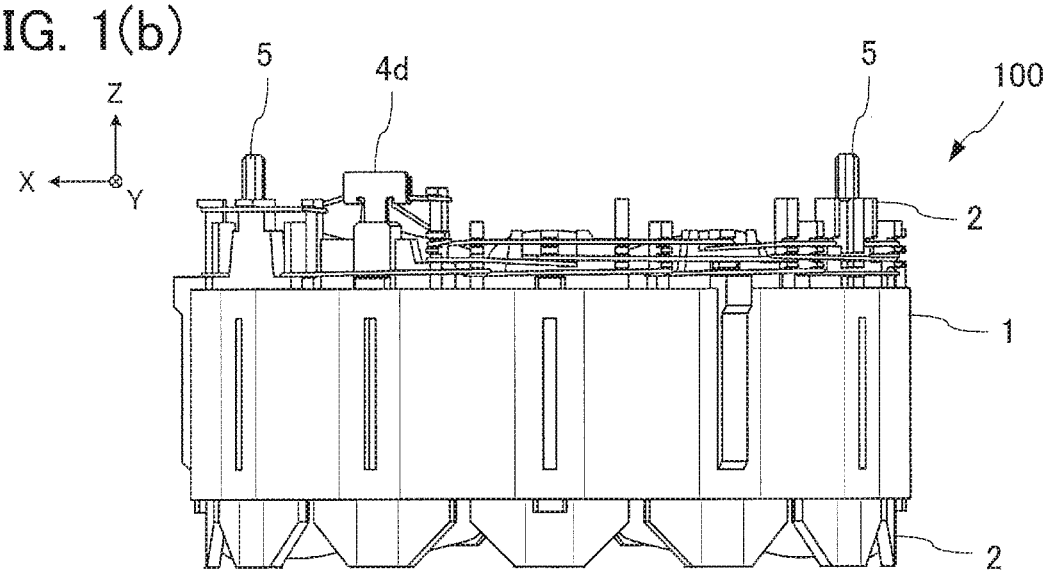
FIG. 1(b) is a side view showing a schematic configuration of the stator (in the state in which the printed circuit board is not attached thereto) according to the first embodiment.

FIG. 1(*a*) is a top view showing a schematic configuration of a stator 100 (in a state in which a printed circuit board 20 is not attached thereto) according to a first embodiment of the present invention, and FIG. 1(*b*) is a side view showing a schematic configuration of the stator 100 (in the state in which the printed circuit board 20 is not attached thereto) according to the first embodiment of the present invention. As shown in FIG. 1(*a*), the stator 100 includes a stator core 1, an insulation part 2, windings 3, terminals 4*a*, 4*b*, 4*c* and 4*d*, and pins 5 for fixing the circuit board.

The stator core 1 includes a plurality of electromagnetic steel sheets stacked in layers. The plurality of electromagnetic steel sheets has holes punched out in belt-like shapes, and the plurality of electromagnetic steel sheets stacked in layers are fixed together by means of crimping, welding, adhesion, or the like. The insulation part 2 is fixed to the stator core 1 by molding a thermoplastic resin such as PBT (polybutylene terephthalate) to be integral with the stator core 1, or by attaching the molded thermoplastic resin to the stator core 1. In regard to the winding 3, a coil is formed by winding magnet wire around the insulation part 2 provided on a tooth of the stator 100. Ends (end portions) of the magnet wire are lead to hook parts (coil tying parts) of the terminals 4*a*, 4*b*, 4*c* and 4*d* and joined to the hook parts by means of fusing (heat crimping), soldering, or the like. The stator core 1 is formed by bending a belt-like core made of a plurality of electromagnetic steel sheets stacked in layers, placing the ends of the core to face each other, and welding the facing parts 1*a* together.

As shown in FIG. 1(*a*), the terminals 4*a*, 4*b*, 4*c* and 4*d* are arranged on an outer wall of the insulation part 2. As shown in FIG. 1(*a*), the terminals 4*a*, 4*b* and 4*c* of multiple phases (winding terminals) which are connected to ends of the windings 3 of the multiple phases (U-phase, V-phase and W-phase) respectively, are arranged on the outer wall of the insulation part 2 in an upper part (+Y direction side) of the stator core 1, and the terminal 4*d* is arranged on the outer wall of the insulation part in a lower part (−Y direction side) of the stator core 1. The terminals 4*a*, 4*b* and 4*c* are terminals used to supply electric power from a power supply respectively to the windings 3 of the multiple phases, and the terminal 4*d* is a terminal used to form a neutral point. The number of the terminals is not limited to four. The terminal 4*d* is not necessarily essential in a case where the neutral point connection is not made by using a terminal.

As shown in FIGS. 1(*a*) and 1(*b*), the pins 5 for fixing the circuit board are arranged at three positions on the insulation part 2. The printed circuit board 20 is fixed to the stator 100 by inserting the pins 5 for fixing the circuit board into pin insertion holes 23 (second insertion holes) of the printed circuit board (circuit board) 20. Incidentally, the number and the positions of the arrangement of the pins 5 for fixing the circuit board are not limited to those shown in FIG. 1(*a*) as long as the configuration enables the fixation of the printed circuit board 20 to the stator 100.

Figure 2:
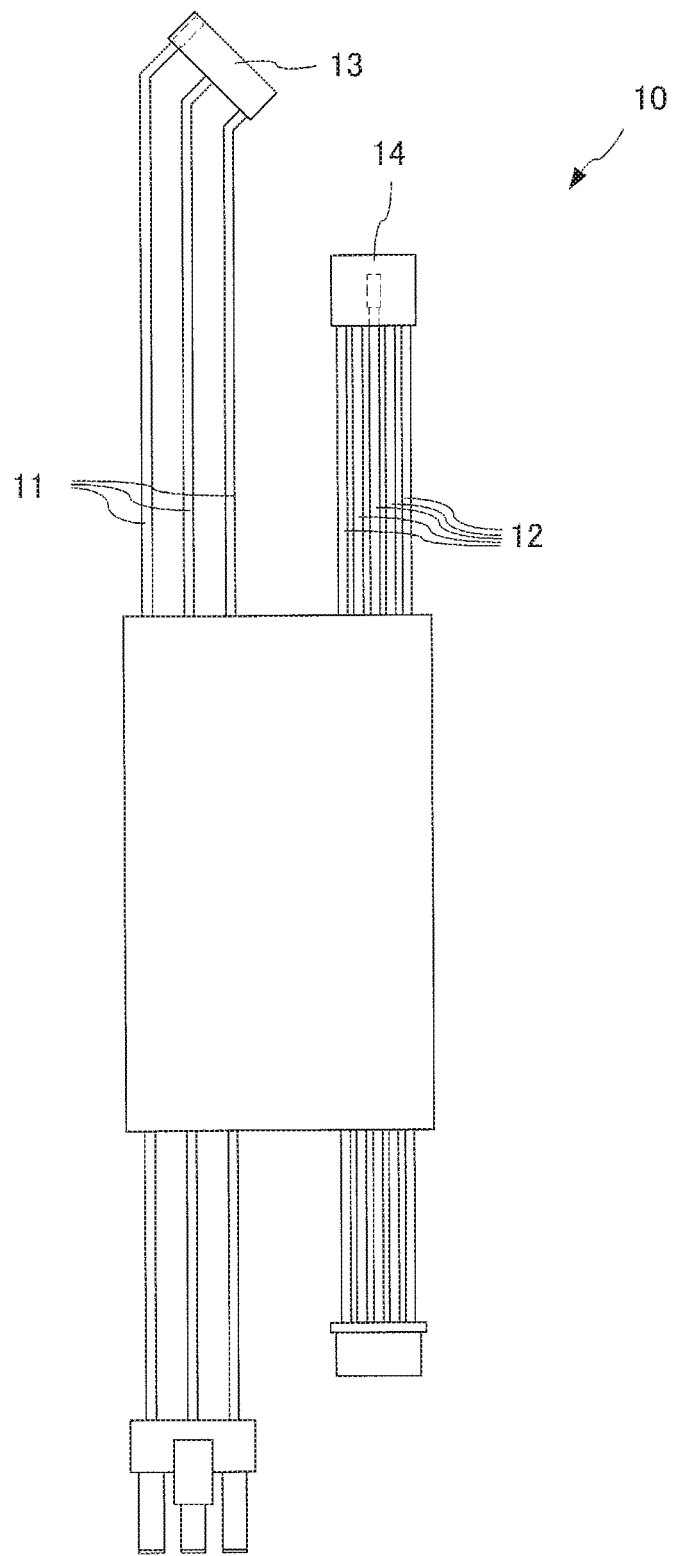
FIG. 2 is a top view showing a schematic configuration of a lead wire part in the first embodiment.

FIG. 2 is a top view showing a schematic configuration of the lead wire part 10 in the first embodiment. As shown in FIG. 2, the lead wire part 10 includes power supply lead wires 11 for supplying electric power to the coils, sensor lead wires 12 for sending signals to position detection circuits, a board-in connector 13 connected to ends of the power supply lead wires 11, and a board-in connector 14 connected to ends of the sensor lead wires 12. The board-in connector 13 is a connector for connecting the power supply lead wires 11 to the printed circuit board 20. The board-in connector 14 is a connector for connecting the sensor lead wires 12 to the printed circuit board 20. While three power supply lead wires 11 and five sensor lead wires 12 are shown in the first embodiment, the numbers of the power supply lead wires 11 and the sensor lead wires 12 are not limited to those shown in FIG. 2.

Figure 3A:
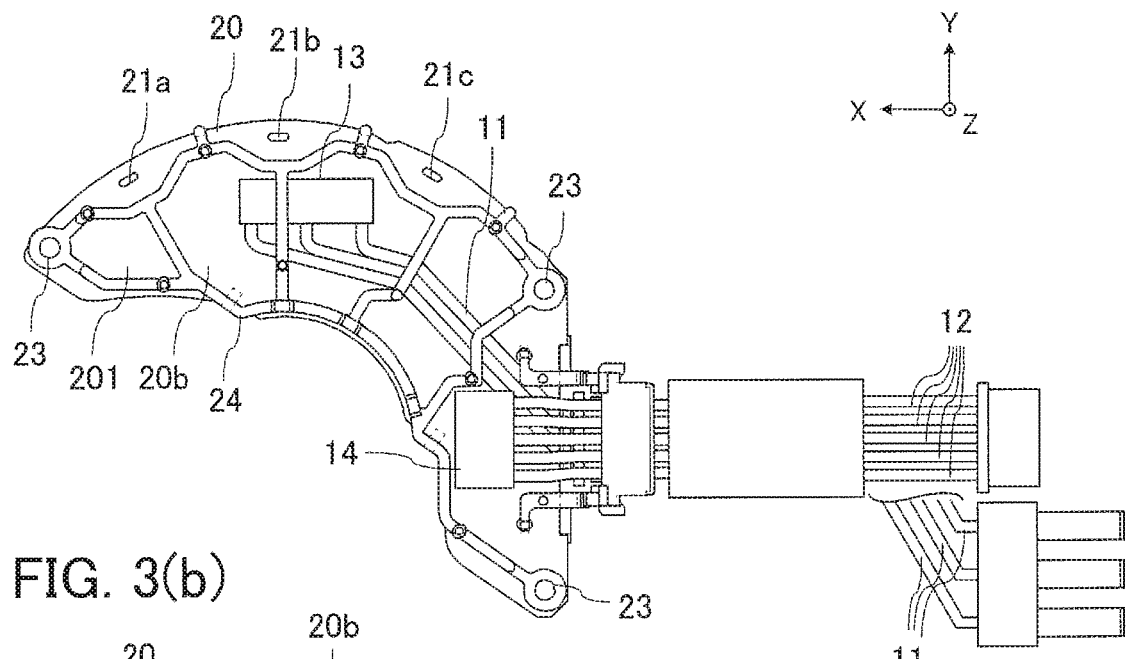
FIG. 3(a) is a top view showing a schematic configuration of the printed circuit board in the first embodiment to which the lead wire part is attached.
Figure 3B:
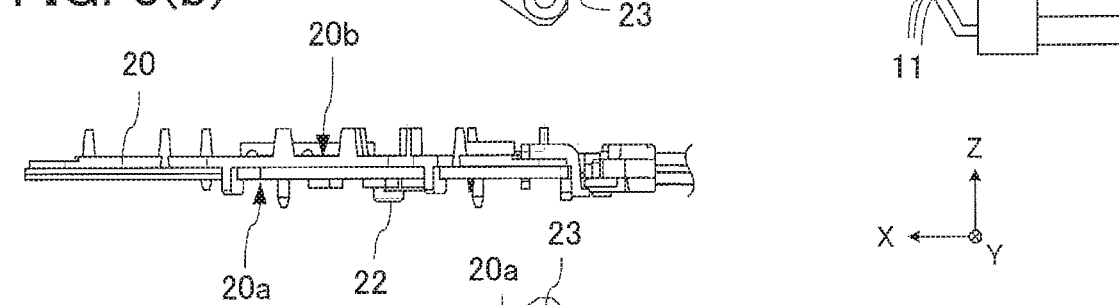
FIG. 3(b) is a side view showing a schematic configuration of the printed circuit board in the first embodiment to which the lead wire part is attached.
Figure 3C:
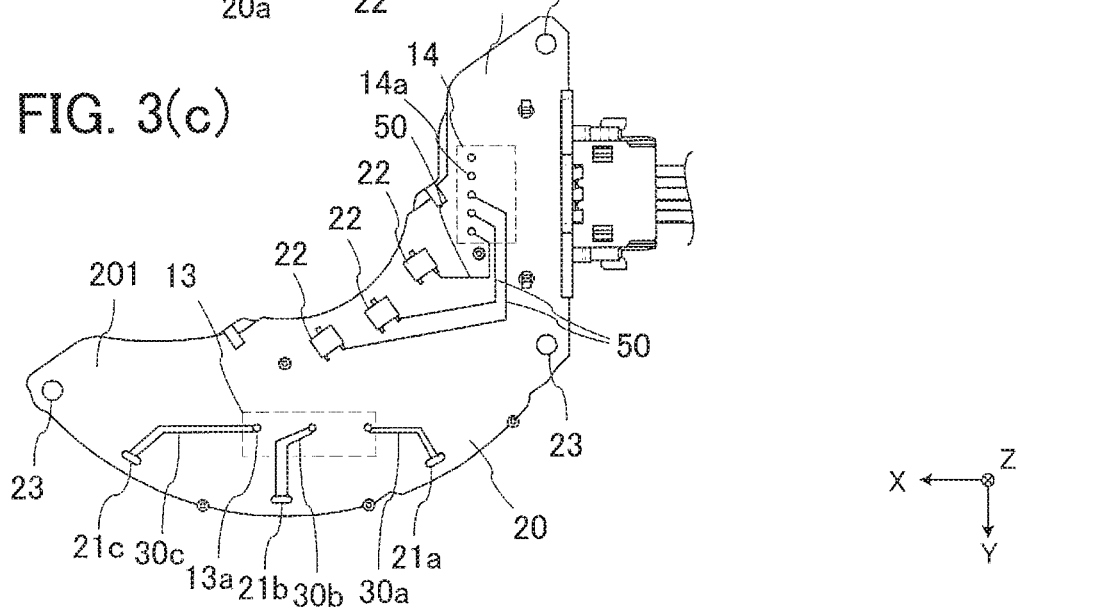
FIG. 3(c) is a bottom view showing a schematic configuration of the printed circuit board in the first embodiment to which the lead wire part is attached.

FIG. 3(*a*) is a top view (viewed in the −Z direction) showing a schematic configuration of the printed circuit board 20 in the first embodiment to which the lead wire part 10 is attached. FIG. 3(*b*) is a side view (viewed in the +Y direction) showing a schematic configuration of the printed circuit board 20 in the first embodiment to which the lead wire part 10 is attached. FIG. 3(*c*) is a bottom view (viewed in the +Z direction) showing a schematic configuration of the printed circuit board 20 in the first embodiment to which the lead wire part 10 is attached.

As shown in FIGS. 3(*b*) and 3(*c*), the printed circuit board 20 in the first embodiment is a printed wiring board including an insulated substrate 201 having a surface 20*a* on the side of the stator core (a surface facing the stator core 1) and a surface 20*b* on the side opposite to the stator core and wiring patterns 30*a*, 30*b* and 30*c* formed on the surface 20*a*. The printed circuit board 20 shown in FIG. 3(*c*) is a single-sided board in which the wiring patterns 30*a*, 30*b* and 30*c* and the position detection circuit are formed exclusively on the surface 20*a* on the side of the stator core.

As shown in FIG. 3(*a*), the lead wire part 10 is attached to the surface 20*b* of the printed circuit board 20 on the side opposite to the stator core via the board-in connectors 13 and 14. As shown in FIG. 3(*c*), the board-in connector 13 connected to the ends of the power supply lead wires 11 is set on the surface 20*b* of the printed circuit board 20 on the side opposite to the stator core, and a terminal 13*a* provided on the board-in connector 13 (referred to also as an electric power supply terminal or a power supply terminal) appears on the surface 20*a* of the printed circuit board 20 on the side of the stator core via an insertion hole formed through the printed circuit board 20. A plurality of terminals is provided as the terminal 13*a*.

As shown in FIG. 3(*c*), a wiring pattern 30*a*, a wiring pattern 30*b* and a wiring pattern 30*c* for supplying electric power (for power supply lead wires), electrically connecting the terminal 13*a* of the board-in connector 13 to the terminals 4*a*, 4*b* and 4*c* connected to the windings 3, are formed on the surface 20*a* of the printed circuit board 20 on the side of the stator core, and the terminal 13*a* of the board-in connector 13 and the terminals 4*a*, 4*b* and 4*c* connected to the windings 3 are electrically connected to each other by joining the terminal 13*a* of the board-in connector 13 to the wiring patterns 30*a*, 30*b* and 30*c* for supplying electric power by means of soldering.

As shown in FIGS. 3(*a*) and 3(*c*), the board-in connector 14 connected to the ends of the sensor lead wires 12 is set on the surface 20*b* of the printed circuit board 20 on the side opposite to the stator core, and the a terminal 14*a* provided on the board-in connector 14 (sensor lead wire terminal) appears on the surface 20*a* of the printed circuit board 20 on the side of the stator core via an insertion hole formed through the printed circuit board 20. A plurality of terminals is provided as the terminal 14*a*. Wiring patterns 50 for sensor lead wires, electrically connecting the terminal 14*a* of the board-in connector 14 to Hall ICs (Hall Integrated Circuits) 22 as magnetic sensors used as the position detection circuits, are formed on the surface 20*a* of the printed circuit board 20 on the side of the stator core (part of the wiring patterns 50 is not shown), and the terminal 14*a* of the board-in connector 14 and the Hall ICs 22 are electrically connected to each other by joining the terminal 14*a* of the board-in connector 14 to the wiring patterns 50 for sensor lead wires by means of soldering.

As shown in FIG. 3(*a*), a substrate retaining member 24 is arranged on the surface 20*b* of the printed circuit board 20 on the side opposite to the stator core. The substrate retaining member 24 is formed by molding a thermoplastic resin such as PBT and has a configuration in which mold contact projections are connected together by thin-wall parts. When the stator 100 is formed by molding, the mold contact projections of the substrate retaining member 24 touch the mold, by which deformation of each wiring board can be prevented.

As shown in FIG. 3(*c*), on the surface 20*a* of the printed circuit board 20 on the side of the stator core, the Hall ICs 22 as the position detection circuits for the rotor are formed at three positions. The Hall ICs 22 include a plurality of position detection circuits. Further, terminal insertion holes 21*a*, 21*b* and 21*c* (first insertion holes) as insertion holes for the terminals 4*a*, 4*b* and 4*c* are formed at three positions.

Figure 4A:
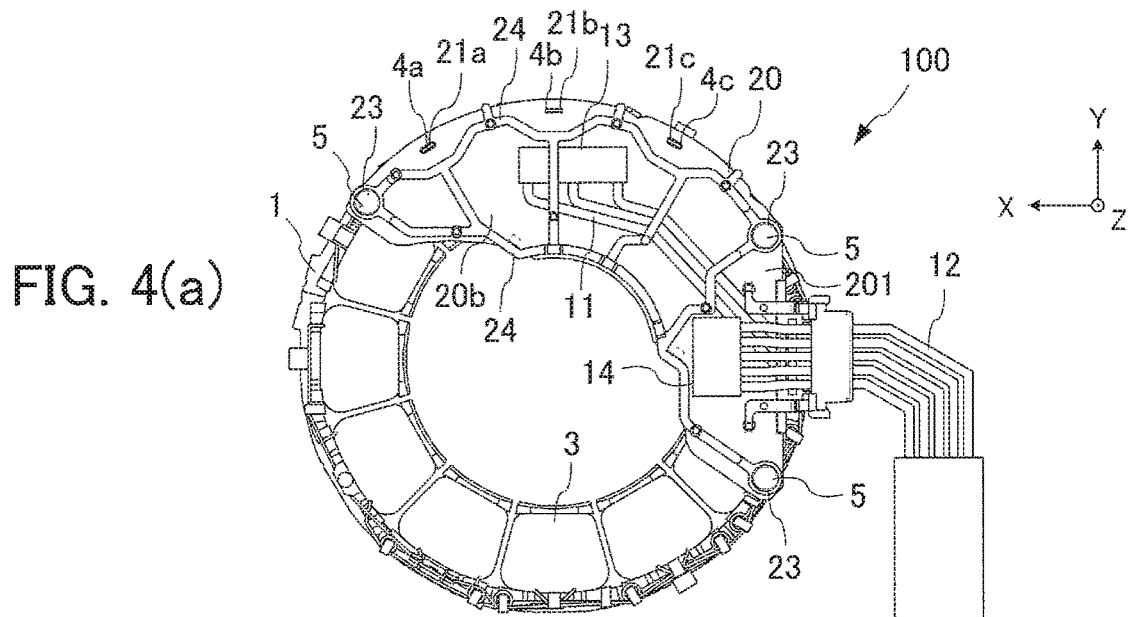
FIG. 4(a) is a top view showing a schematic configuration of the stator in the first embodiment to which the printed circuit board is attached.
Figure 4B:
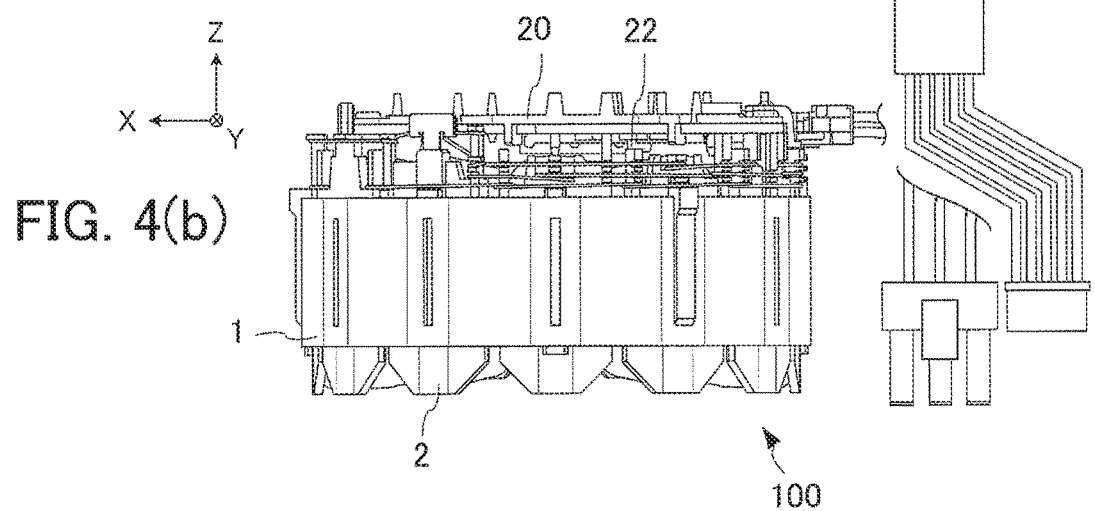
FIG. 4(b) is a side view showing a schematic configuration of the stator in the first embodiment to which the printed circuit board is attached.
Figure 4C:
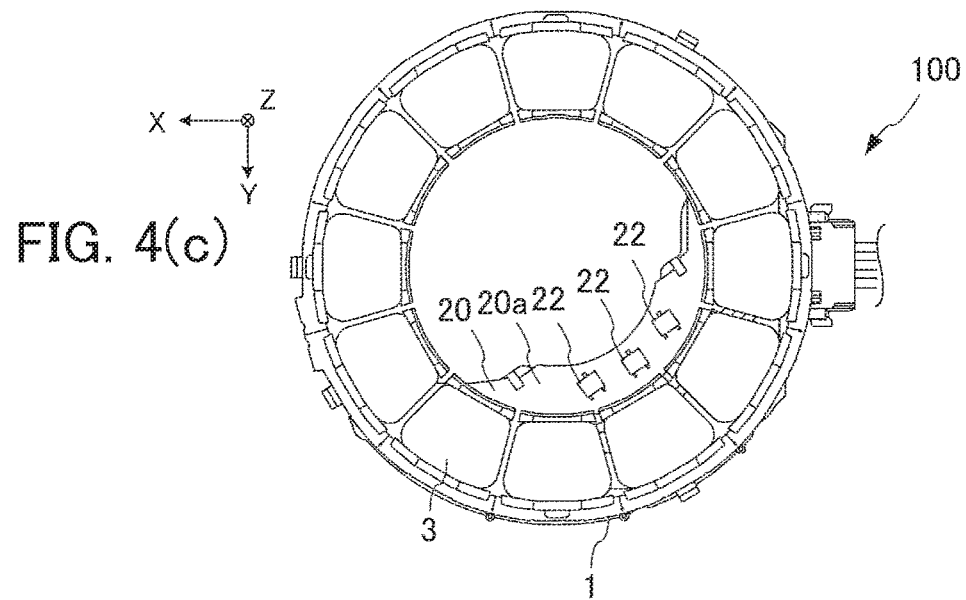
FIG. 4(c) is a bottom view showing a schematic configuration of the stator in the first embodiment to which the printed circuit board is attached.

FIG. 4(*a*) is a top view (viewed in the −Z direction) showing a schematic configuration of the stator 100 in the first embodiment to which the printed circuit board 20 is attached. FIG. 4(*b*) is a side view (viewed in the +Y direction) showing a schematic configuration of the stator 100 in the first embodiment to which the printed circuit board 20 is attached. FIG. 4(*c*) is a bottom view (viewed in the +Z direction) showing a schematic configuration of the stator 100 in the first embodiment to which the printed circuit board 20 is attached.

As shown in FIG. 4(*a*), the printed circuit board 20 to which the lead wire part 10 is attached is fixed to the stator 100 by inserting the pins 5 for fixing the circuit board into the pin insertion holes 23 of the printed circuit board 20. At that time, the terminals 4*a*, 4*b* and 4*c* are inserted into the terminal insertion holes 21*a*, 21*b* and 21*c* of the printed circuit board 20 and soldered. Further, as shown in FIG. 4(*c*), the Hall ICs 22 are arranged at positions where the position of the rotor can be detected.

Figure 5A:
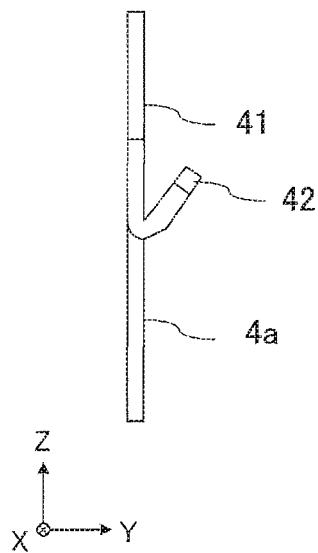
FIG. 5(a) is a side view showing a schematic configuration of a terminal in the first embodiment.
Figure 5B:
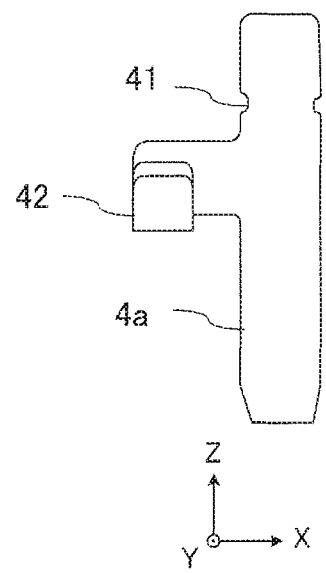
FIG. 5(b) is a front view showing a schematic configuration of the terminal in the first embodiment.
Figure 6:
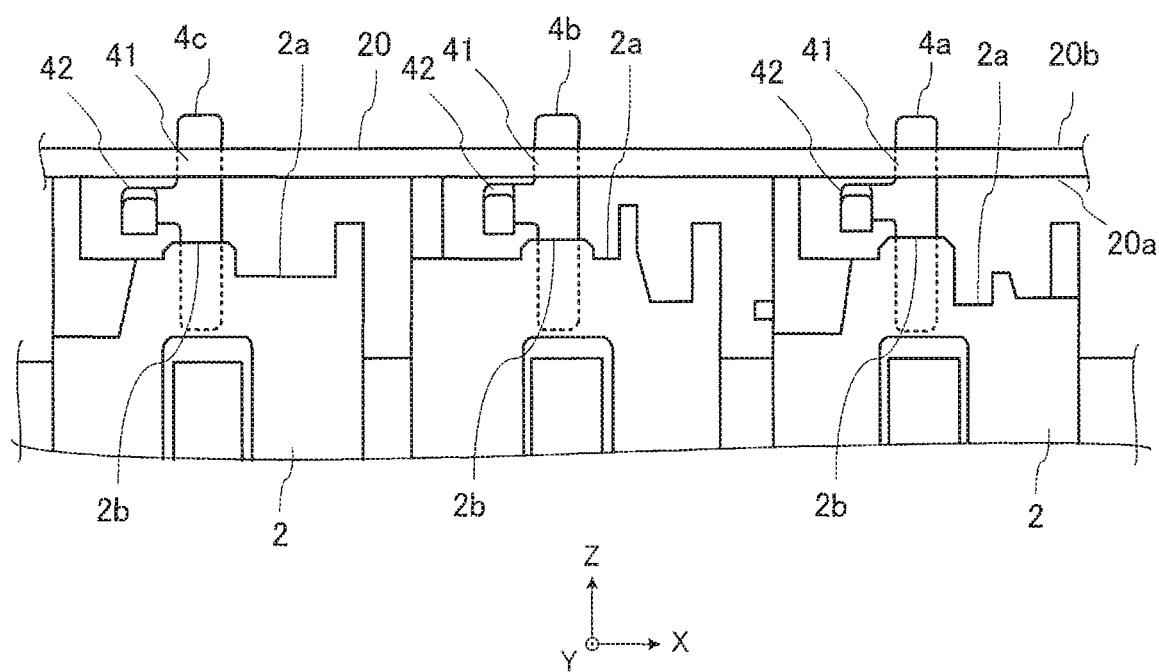
FIG. 6 is an enlarged side view showing a state in which the terminals and the printed circuit board are joined in the first embodiment.

FIG. 5(*a*) is a side view showing a schematic configuration of the terminal 4*a* in the first embodiment. FIG. 5(*b*) is a front view showing a schematic configuration of the terminal 4*a* in the first embodiment. FIG. 6 is an enlarged side view showing a positional relationship among the terminals 4*a*, 4*b* and 4*c* and the printed circuit board 20 in the first embodiment. Incidentally, while the terminal 4*a* is illustrated in FIGS. 5(*a*) and 5(*b*), the terminal 4*b* and the terminal 4*c* also have substantially the same configuration.

As shown in FIG. 4 and FIGS. 5(*a*) and 5(*b*), each terminal 4*a*, 4*b*, 4*c* includes a joint part 41 to be inserted into the terminal insertion hole 21*a*, 21*b* or 21*c* of the printed circuit board 20 and a coil tying (winding) part 42 that is bent to be orthogonal to the axial direction of the stator 100 (Z direction). The joint parts 41 are parts formed in upper parts of the terminals 4*a*, 4*b* and 4*c*, and are inserted into the terminal insertion holes 21*a*, 21*b* and 21*c* of the printed circuit board 20 and electrically joined to wiring patterns of the printed circuit board 20 by soldering or the like. The coil tying (winding) parts 42 is a part formed by bending a part of each terminal 4*a*, 4*b*, 4*c*, and is a part used for fixing the winding 3 by hooking the winding 3 on the part and winding the winding 3 around the part. A plurality of windings is provided as the winding 3.

As shown in FIG. 6, the joint parts 41 of the terminals 4*a*, 4*b* and 4*c* are inserted into and fixed to the terminal insertion holes 21*a*, 21*b* and 21*c* of the printed circuit board 20. Further, the insulation part 2 located around the terminal and on a side opposite to the part where the coil tying part 42 is formed, includes a region 2*a* formed to be relatively low compared to the insulation part 2 around the region 2*a*. Thanks to the region 2*a*, insertion of a soldering iron or the like is facilitated and workability of the soldering is improved. In other words, the outer wall of the insulation part 2 includes a first outer wall part 2*b* supporting the terminals 4*a*, 4*b* and 4*c* as winding terminals and a second outer wall part (concave region) 2*a* arranged adjacent to the first outer wall part 2*b*, and the height of the second outer wall part 2*a* in the axial line direction of the stator 100 (Z direction) is lower than the height of the first outer wall part 2*b* in the axial line direction.

Figure 7A:
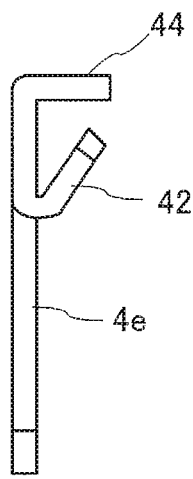
FIG. 7(a) is a side view showing a schematic configuration of a terminal in a modification of the first embodiment.
Figure 7B:
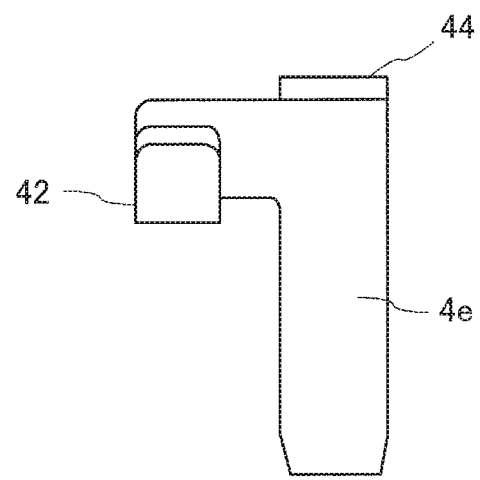
FIG. 7(b) is a front view showing a schematic configuration of the terminal in the modification of the first embodiment.
Figure 8:
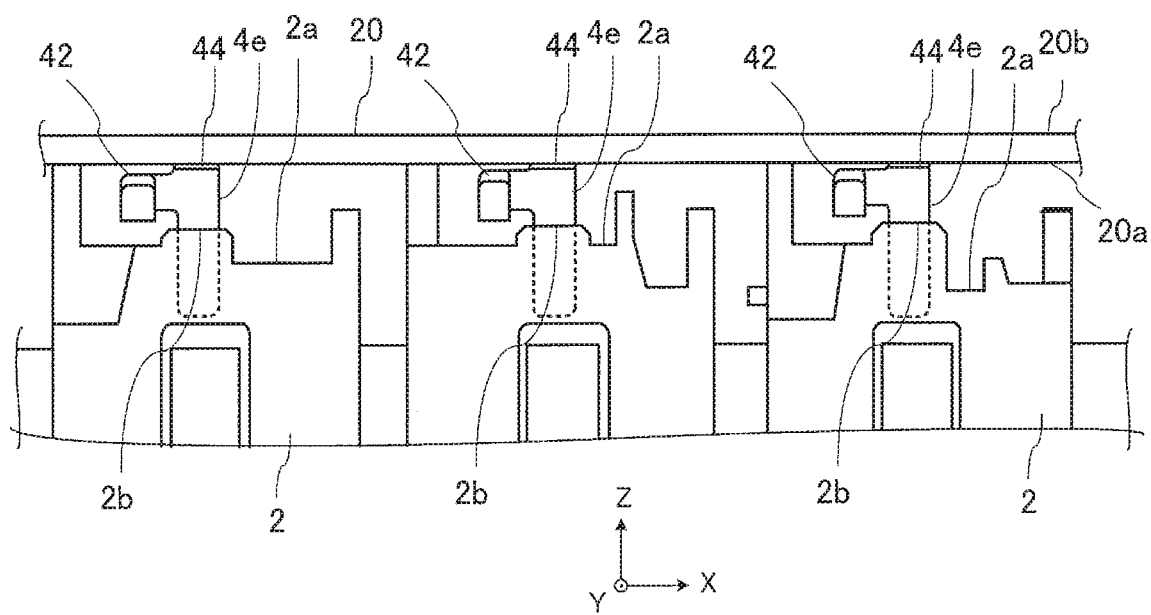
FIG. 8 is an enlarged side view showing a state in which terminals and a printed circuit board are joined in the modification of the first embodiment.

FIG. 7(*a*) is a side view showing a schematic configuration of a terminal 4*e* in a modification of the first embodiment. FIG. 7(*b*) is a front view showing a schematic configuration of the terminal 4*e* in the modification of the first embodiment. FIG. 8 is an enlarged side view showing a positional relationship between the terminal 4*e* and the printed circuit board 20 in the modification of the first embodiment. In FIGS. 7(*a*) and 7(*b*), components identical or corresponding to those in FIGS. 5(*a*) and 5(*b*) are assigned the same reference characters as those in FIGS. 5(*a*) and 5(*b*). In FIG. 8, components identical or corresponding to those in FIG. 6 are assigned the same reference characters as those in FIG. 6.

As shown in FIGS. 7(*a*) and 7(*b*), the terminal 4*e* in the modification includes a surface 44 formed by bending a part of the terminal 4*e* to be orthogonal to the axial direction of the stator 100 (Z direction). As shown in FIG. 8, the surface 44 of the bent part of the terminal 4*e* is pressed against each wiring pattern 30*a*, 30*b*, 30*c* of the printed circuit board 20 and electrically joined to each wiring pattern 30*a*, 30*b*, 30*c* by soldering or the like. In other words, the terminal 4*e* has the surface 44 facing a wiring pattern for supplying electric power (e.g., the wiring patterns 30*a*, 30*b*, 30*c* shown in FIG. 3(*c*)), and the surface 44 facing the wiring pattern is connected to the wiring pattern for supplying electric power in a state of being pressed against the wiring pattern for supplying electric power. According to the shape of the terminal 4*e* in the modification, the terminal 4*e* does not project to the surface 20*b* of the printed circuit board 20 on the side opposite to the stator core, and thus the need of forming the terminal insertion holes through the printed circuit board 20 is eliminated. Further, since the terminal 4*e* and the printed circuit board 20 are joined together by surfaces, the terminal 4*e* can be fixed to the printed circuit board 20 more firmly. Furthermore, the need of outer cover resin, which used to be necessary for covering the terminals projecting from the printed circuit board 20, can be eliminated and the manufacturing cost of the stator 100 can be reduced.

Figure 9:
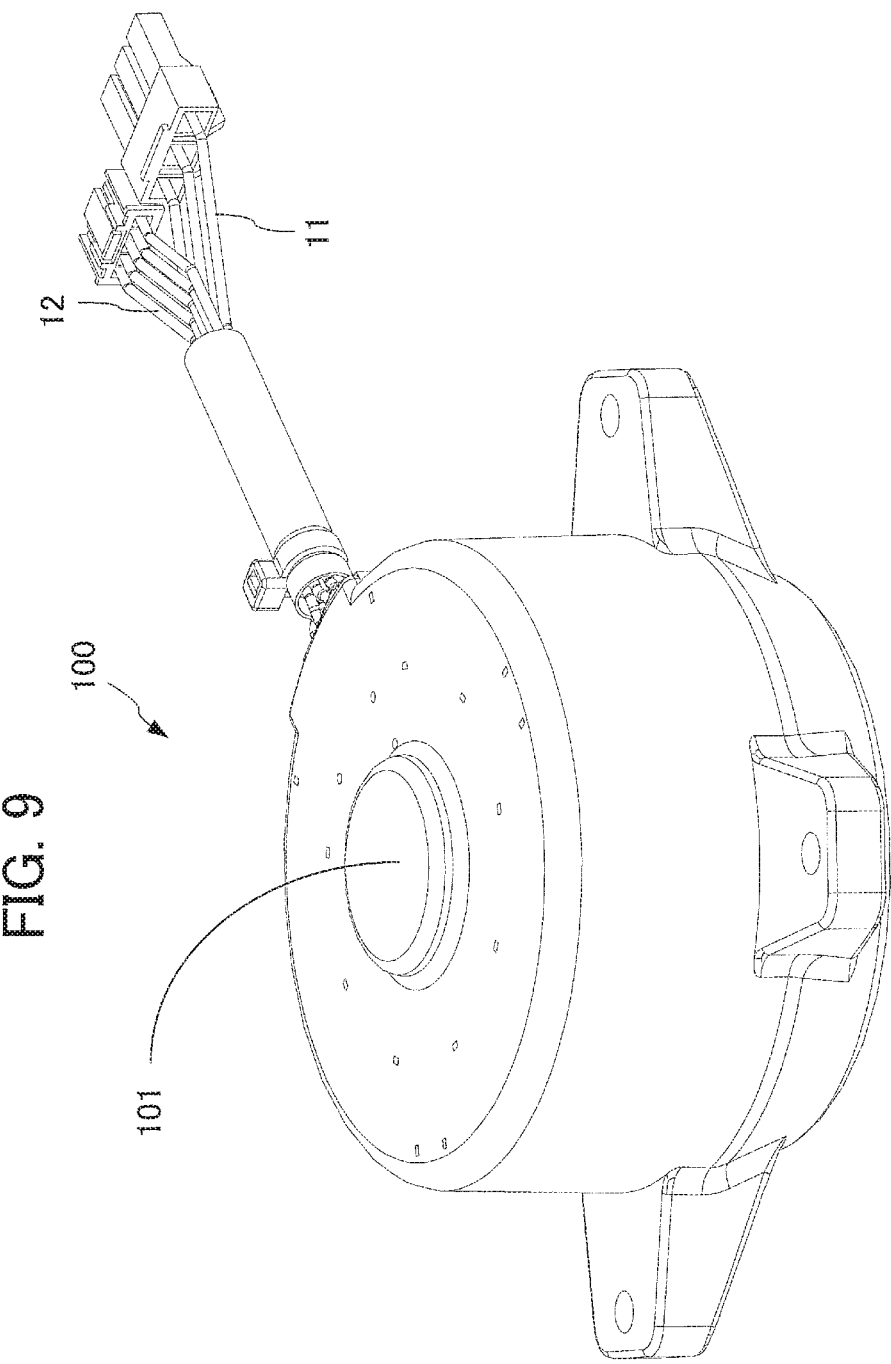
FIG. 9 is a perspective view schematically showing a structure of the stator after molding in the first embodiment.

FIG. 9 is a perspective view schematically showing the structure of the stator 100 according to the first embodiment after the molding. As shown in FIG. 9, the stator 100 after the molding is molded uniformly thanks to mold resin, and has an opening 101 at the center. Into the opening 101, the rotor is inserted.

(1-2) Effect

In the stator 100 according to the first embodiment, the printed circuit board 20 is configured by printing the wiring patterns 30a, 30b and 30c on the surface 20a of the printed circuit board 20 on the side of the stator core and electrically connecting the windings 3 wound around the stator core 1 and the wiring patterns 30a, 30b and 30c of the printed circuit board 20 to each other on the surface 20a on the side of the stator core, which makes it possible to form the printed circuit board 20 as a single-sided board less expensive than a double-sided board and reduce the manufacturing cost of the stator 100.

In the stator 100 according to the first embodiment, the printed circuit board 20 is provided with the Hall ICs 22, as the position detection circuits detecting the magnetic flux of the rotor, on the surface 20a of the printed circuit board 20 on the side of the stator core. According to this configuration, the position detection circuits are provided on the surface 20a on the side of the stator core which is the same surface as the wiring patterns 30a, 30b and 30c for supplying electric power, and accordingly, the printed circuit board 20 can be formed as a single-sided board and the manufacturing cost of the stator 100 can be reduced.

In the stator 100 according to the first embodiment, the printed circuit board 20 having the wiring patterns for supplying electric power to the windings 3 wound around the stator core 1 is provided and the electric joint parts between the printed circuit board 20 and the windings 3 wound around the stator core 1 are provided on the surface 20a on the side of the stator core. This makes it possible to downsize or eliminate the components for joining the windings 3 to the printed circuit board 20 and reduce the manufacturing cost of the stator 100.

In the stator 100 according to the first embodiment, the insulation part 2 located around the terminal and on the side opposite to the part where the coil tying part 42 is formed, includes the region 2a formed to be relatively low compared to the insulation part 2 around the region 2a. Accordingly, a soldering iron or the like can be inserted into the region 2a, the joining of each terminal 4a, 4b, 4c to the printed circuit board 20 is facilitated, and the workability is improved, by which the manufacturing cost of the stator 100 can be reduced.

(2) Second Embodiment

Figure 10:
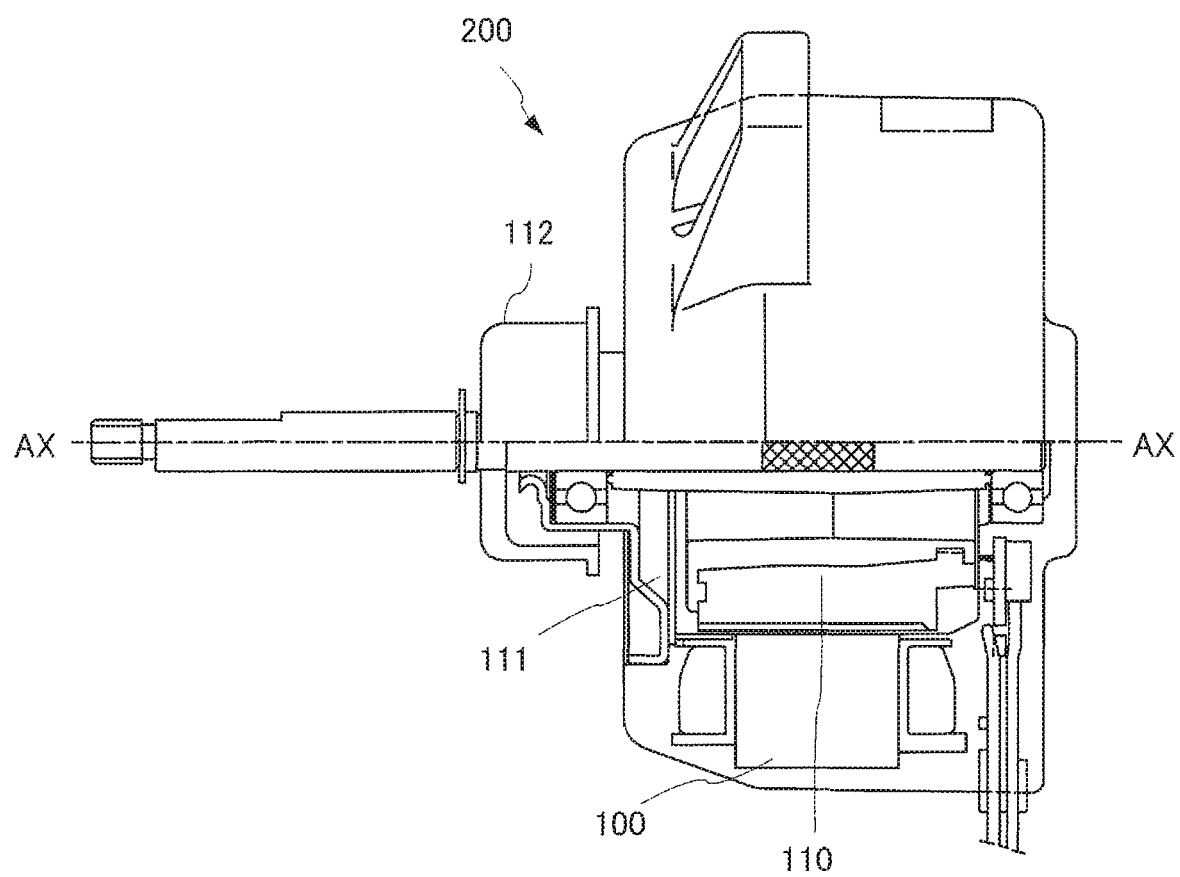
FIG. 10 is a side view schematically showing a configuration of a motor according to a second embodiment of the present invention.

FIG. 10 is a side view schematically showing a motor 200 according to a second embodiment of the present invention. As shown in FIG. 10, the motor 200 according to the second embodiment includes the stator 100 according to the first embodiment or its modification, a rotor 110, and a support part to which the stator 100 is fixed and which supports the rotor 110 to be rotatable (e.g., to be rotatable by using a bearing). The rotor 110 rotates around an axis line AX. The support part includes a frame (body frame) and a bracket 111 that rotatably supports the rotor 110, for example. The motor 200 has a waterproof cap 112 that inhibits penetration of water into the bearing and other parts of the motor 200.

According to the motor 200 according to the second embodiment, an effect of reducing the manufacturing cost of the motor 200 can be obtained in addition to the effects obtained by the stator 100 described in the first embodiment.

(3) Third Embodiment

Figure 11:
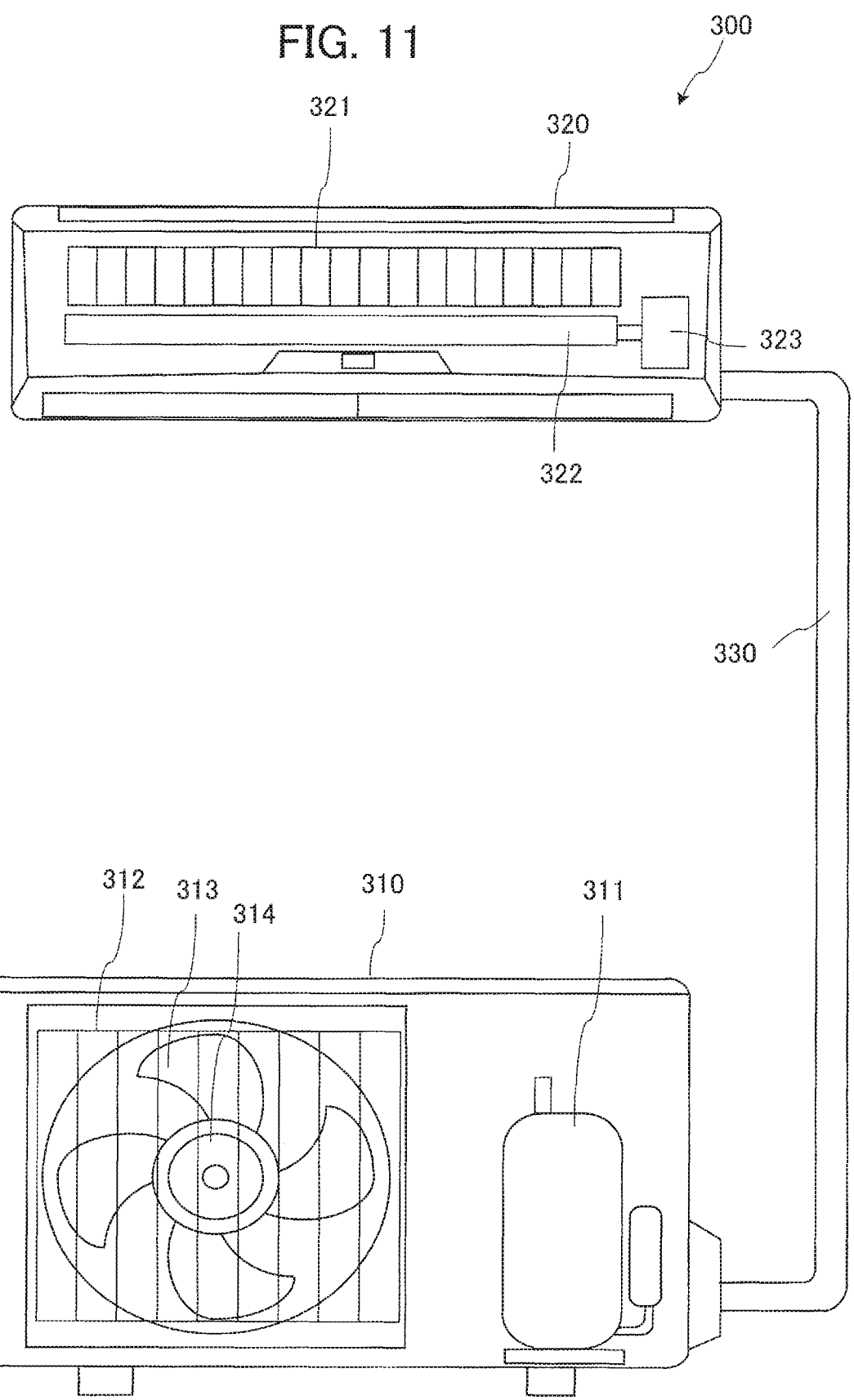
FIG. 11 is a diagram schematically showing a configuration of an air conditioner according to a third embodiment of the present invention.

FIG. 11 is a diagram schematically showing a configuration of an air conditioner 300 according to a third embodiment of the present invention. As shown in FIG. 11, the air conditioner 300 includes an outdoor unit 310, an indoor unit 320, and refrigerant piping 330 for circulating a refrigerant between the outdoor unit 310 and the indoor unit 320.

The outdoor unit 310 includes a compressor 311, a heat exchanger 312, a fan 313, and a motor 314 for rotating the fan 313. The motor 314 and the fan 313 constitute a blower for supplying air to the heat exchanger 312. The indoor unit 320 includes a heat exchanger 321, a fan 322, and a motor 323 for rotating the fan 322.

The motor 323 and the fan 322 constitute a blower for supplying air to the heat exchanger 321. In the air conditioner 300 according to the third embodiment, at least one of the motor 314 and the motor 323 is formed by the motor 200 according to the second embodiment. In the air conditioner 300 according to the third embodiment, either of a cooling operation for blowing out cool air from the indoor unit 320 and a heating operation for blowing out warm air from the indoor unit 320 can be performed selectively. The air conditioner 300 according to the third embodiment can be configured in the same way as conventional air conditioners except that the motor 200 according to the second embodiment is employed as at least one of the motor 314 and the motor 323.

According to the air conditioner 300 according to the third embodiment, an effect of reducing the manufacturing cost of the air conditioner 300 can be obtained in addition to the effects obtained by the stator 100 described in the first embodiment and the effects obtained by the motor 200 described in the second embodiment.

Incidentally, air conditioners to which the present invention is applicable are not limited to air conditioners for indoor use like that shown in FIG. 11. The present invention is applicable to various types of devices equipped with a motor, such as air conditioners for freezing warehouses and air conditioners for refrigerators.

What is claimed is:

1. A stator to which a power supply lead wire for supplying electric power is connected, the stator comprising:
    a stator core;
    an insulation part covering the stator core;
    a winding wound around the stator core via the insulation part;
    a winding terminal fixed on an outer wall of the insulation part and connected to the winding;
    a circuit board having a first surface facing the stator core, a second surface provided on a side opposite to the first surface, a power-supply-terminal insertion hole communicating between the first surface and the second surface at a position facing the winding, and a winding-terminal insertion hole communicating between the first surface and the second surface and being arranged on a radially outward position relative to the power-supply-terminal insertion hole in a radial direction of the stator core;
    a power supply terminal exposed on the first surface via the power-supply-terminal insertion hole to connect to the power supply lead wire arranged on the side of the second surface; and
    a wiring pattern provided on the first surface and connecting the winding terminal and the power supply terminal to each other, wherein
    the winding terminal is electrically connected to the wiring pattern by soldering the winding terminal in a state of being inserted into the winding-terminal insertion hole from the first surface of the circuit board.

2. The stator according to claim 1, further comprising a position detection circuit provided on the first surface and detecting a position of a rotor in a rotation direction.

3. The stator according to claim 2, further comprising:
a sensor lead wire terminal provided on the first surface and connected to a sensor lead wire; and
a sensor lead wire wiring pattern provided on the first surface and connecting the sensor lead wire terminal and the position detection circuit to each other.

4. The stator according to claim 1, wherein
the winding terminal is inserted into the winding-terminal insertion hole from the first surface and projects from the second surface.

5. The stator according to claim 1, wherein the winding terminal has a surface facing the wiring pattern, and the surface facing the wiring pattern is connected to the wiring pattern in a state of being pressed against the wiring pattern.

6. The stator according to claim 1,
further comprising a pin for fixing the circuit board, the pin being provided on the insulation part, and
the circuit board has a pin insertion hole into which the pin for fixing the circuit board is inserted.

7. The stator according to claim 6, wherein
the outer wall of the insulation part includes a first outer wall part supporting the winding terminal and a second outer wall part arranged adjacent to the first outer wall part, and
height of the second outer wall part in an axial line direction of the stator is lower than height of the first outer wall part in the axial line direction.

8. A motor comprising:
the stator according to claim 1;
a rotor; and
a support part to which the stator is fixed and which rotatably supports the rotor.

9. An air conditioner comprising a blower,
wherein the blower includes the motor according to claim 8.

* * * * *